United States Patent [19]

Becker

[11] Patent Number: 5,104,529

[45] Date of Patent: Apr. 14, 1992

[54] COOLANT RECYCLER

[75] Inventor: Roger T. Becker, Kalamazoo, Mich.

[73] Assignee: Kalamazoo Conveyor Company, Kalamazoo, Mich.

[21] Appl. No.: 732,611

[22] Filed: Jul. 19, 1991

[51] Int. Cl.$^5$ .............................................. B01D 25/00
[52] U.S. Cl. ................................. 210/195.1; 210/258; 210/259; 210/474; 210/241
[58] Field of Search ................ 210/195.1, 474, 266, 210/258, 259, 260, 799, 473, 693, 260, DIG. 5

[56] References Cited

U.S. PATENT DOCUMENTS

| | | | |
|---|---|---|---|
| 3,478,874 | 11/1969 | McLean et al. | 210/703 |
| 4,361,488 | 11/1982 | White et al. | 210/DIG. 5 |
| 4,717,475 | 1/1988 | Brandt et al. | 210/DIG. 5 |
| 4,751,006 | 6/1988 | Becker | 210/783 |
| 4,772,402 | 9/1988 | Love | 210/804 |
| 4,865,724 | 9/1989 | Brandt et al. | 210/104 |
| 4,895,649 | 1/1990 | Brandt et al. | 210/257.2 |
| 4,966,693 | 10/1990 | Brandt et al. | 210/257.2 |

Primary Examiner—Stanley S. Silverman
Assistant Examiner—Cynthia L. Nessler
Attorney, Agent, or Firm—Flynn, Thiel, Boutell & Tanis

[57] ABSTRACT

A coolant recycling apparatus having first and second storage tanks mounted on a wheeled cart. The first tank has a suction device associated therewith to which is coupled a flexible suction hose to suck contaminated coolant from the sump of a machine tool, whereby the coolant flows through the suction device and then through a filter for removing larger solids, whereupon the contaminated coolant is then deposited in the first tank. A pump sucks the contaminated coolant from the first tank and supplies it to a filter disposed adjacent the upper end of the second tank. This filter has a stack of oil absorbent pads which remove tramp oil as the coolant flows downwardly and then collects in the second tank. The clean coolant in the second tank is sent back to the pump through suitable valving which enables the coolant to be supplied to a dishcarge hose which feeds the clean coolant back to the sump.

5 Claims, 1 Drawing Sheet

COOLANT RECYCLER

FIELD

This invention relates to an apparatus for recycling coolant, and in particular an improved apparatus which can effectively remove both solid fines and tramp oil from coolant so as to extend the reusable life of the coolant.

BACKGROUND OF THE INVENTION

The conventional water-soluble coolant used in machine tools becomes contaminated during use, which contamination involves not only solid contaminants such as machine chips and the like, but also contamination by typical oils such as hydraulic fluids, such oils being referred to as "tramp oil".

At present, various cleaning processes and apparatus have been proposed for removing various contaminants, the most simple and easiest contaminant to remove being the course solid contaminants such as machining chips. Most attempts to recycle coolant, however, have been unable to effectively remove a majority of both solid and liquid contaminants, namely both solid fines (ie, the very small or fine solid particles) and the tramp oil. While numerous attempts have been made to recycle coolant, most recycling attempts have, at best, attempted to remove only part of the contaminants, such as either solids or liquids.

One prior attempt to remove both the solid fines and the portable apparatus illustrated in my earlier U.S. Pat. No. 4,872,997, issued Oct. 10, 1989 and entitled "Coolant Recycling System and Method". The arrangement of this earlier patent employs a tank into which the contaminated coolant is deposited, with the supply of coolant to the tank passing through a filter in an attempt to remove the solid finds. The coolant in the tank is then bubbled by injecting air streams into the bottom thereof, which creates upwardly-passing bubble streams in an attempt to effect separation of the tramp oil so that it can rise to the surface. While the arrangement of the aforesaid patent has been partially effective in recycling coolant, nevertheless this prior arrangement has been less than optimum in terms of performance. More specifically, it has been observed that the bubbling technique is slow in terms of effecting separation of the tramp oil, and hence the technique thus does not possess the speed which is desired for practical commercial application in most use environments. Further, this bubbling technique is not believed to be as suitable for use in a portable recycling device which is either transported from plant to plant, or moved about from machine to machine within a single manufacturing plant, due to the criticality of the air pressure which must be used to perform the bubbling process.

Accordingly, it is an object of this invention to provide an improved recycling apparatus which can effectively remove both solid fines and tramp oil, and which can do so at a rate which is believed to be commercially satisfactory so as to permit its efficient and economical use, with the apparatus being particularly suitable for incorporation into a portable arrangement so as to be movable from machine to machine.

In the improved coolant recycling apparatus of the present invention, there is provided first and second storage tanks mounted on a small wheeled cart so that the overall apparatus is portable and can be readily moved about. The first tank has a suction device associated therewith to which is coupled a flexible suction hose terminating in a wand. This is used to suck the contaminated coolant from the sump of the machine tool, whereby the coolant flows through the suction device and thence through a filter associated therewith for removing the larger solids, whereupon the contaminated coolant is then deposited or collected in the first tank. A pump sucks the contaminated coolant from the first tank and supplies it to a filter disposed adjacent the upper end of the second tank. This filter has a stack of oil absorbent pads therein which effectively remove the tramp oil as the coolant flows downwardly through the filter and then collects in the bottom of the second tank. The clean coolant in the bottom of the second tank is sent back to the pump through suitable valving which, by suitable control, enables the coolant to be sucked out of the second tank and then supplied to a discharge hose which can be utilized to supply the clean coolant back into the sump of a machine tool. The apparatus also has a small storage tank for containing concentrated new coolant (which also normally contains a biocide) so that concentrated new coolant can be added to the cleaned coolant which has been collected in the second tank for supply to the machine tool sump.

With the arrangement as described above, the tramp oil can be effectively removed and the oil absorbent pads can be readily replaced when necessary, and at the same time the coolant can be recycled and cleaned of contaminants in an efficient and time saving manner. This arrangement also permits the coolant to be withdrawn from the machine tool, recycled and cleaned, and then resupplied to the same machine tool if desired within a short period of time so that coolant recycling can hence be carried out in an efficient and time saving manner.

Other oojects and purposes of the invention will be apparent to persons familiar with arrangements of this general type upon reading the following specifications and inspecting the accompanying drawings.

Figure 1:
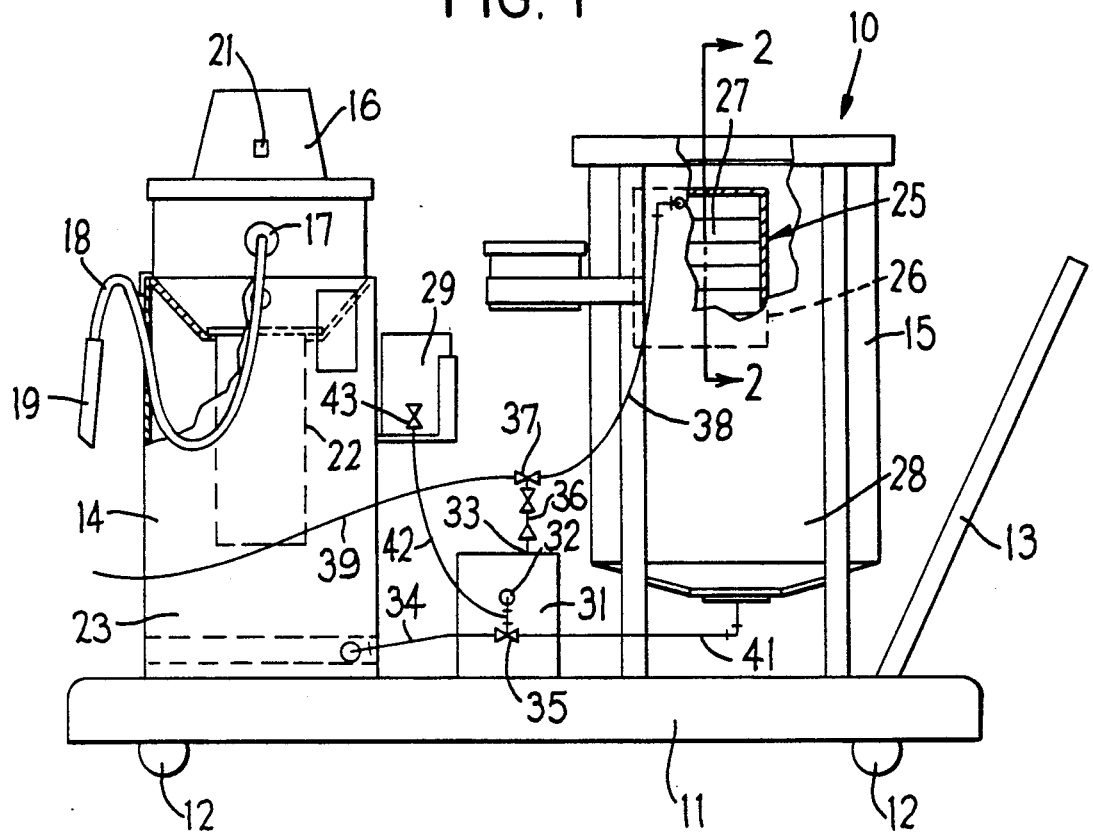
FIG. 1 is a side elevation of view, partially broken away, and illustrating the improved apparatus of the present invention.
Figure 2:
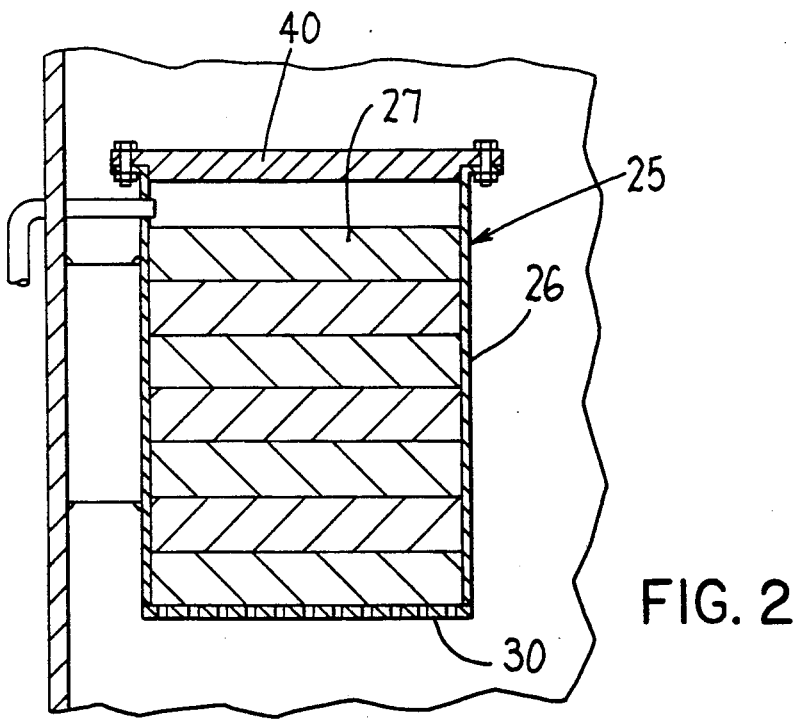
FIG. 2 is an enlarged sectional view taken substantially along line 2—2 in FIG. 1.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and designated parts thereof. Said terminology will include the words specifically mentioned, derivatives thereof, and words with similar import.

DETAILED DESCRIPTION

Referring to the drawings, there is illustrated a recycling apparatus 10 of the present invention for permitting cleaning and hence extended use of coolant in a machine tool. This system 10 includes a base or frame 11 which is preferably supported on wheels or casters 12, and having a handle 13 at one end, thereby defining a mobile cart so that the system can be readily moved about, such as from machine tool to machine tool.

The cart supports thereon a pair of tanks, namely a contaminated coolant tank 14 for receiving the dirty coolant from a machine tool, and a recycled coolant tank 15 in which the cleaned coolant collects prior to being resupplied to a machine tool. Each of these tanks 14 and 15 is of a generally upright tubular construction, with the tanks being disposed in sidewardly spaced but closely adjacent relationship on the cart.

The contaminated coolant tank 14 has a suction device 16 mounted on the upper end thereof. This suction device 16 is of conventional construction and includes an inlet 17 connected to a suction hose 18 which at its free end is provided with a wand 19. A conventional on-off switch 21 is provided for controlling energization of the suction device. This device is substantially the same as a wet-type vacuum in that it is capable of sucking liquid into the device and then discharging the liquid through a bottom opening which opens downwardly into the interior of the tank 14. The suction device 16 removably mounts on the bottom thereof, in surrounding relationship to the discharge, a conventional bag-type filter 22 which is capable of permitting the liquid coolant to pass therethrough while filtering out the solids. The contaminated coolant, from which the solids have been filtered, hence flows downwardly and collects within a chamber 23 defined at the bottom of the tank 14.

The recycled coolant tank 15 mounts therein, adjacent the upper end thereof, an oil filtering arrangement 25 for removing the tramp oil from the coolant. This filtering arrangement 25 includes a generally tubular support wall or housing 26 which terminates in a bottom wall 30 which is of an mesh-like or perforated construction so as to permit free passage of coolant downwardly therethrough. This support wall 26 confines therein a filtering media 27 which is capable of separating the tramp oil from the coolant. This filtering media comprises an oil-absorbent filtering media and preferably a plurality of cloth-like oil absorbent pads which are stacked vertically within the support wall 26. Such oil absorbent pads are known, and one manufacturer of such pads is Petro Boom Environmental, Inc. The top of the tubular support wall 26 is sealingly closed by a removable cover 40. The pads 27 are sized to snugly engage the housing sidewall, whereby the upper end of the housing is partially sealingly isolated from the discharge opening defined in the bottom wall 30.

As the contaminated coolant flows downwardly through the oil filtering arrangement 25, the absorbent pads 27 are effective in removing the tramp oil from the coolant, whereupon the thus filtered coolant flows downwardly and collects within a chamber 28 defined at the bottom of the tank 15.

The recycling system 10 also includes a third tank 29 mounted on the mobile cart. This tank 29 is, in the illustrated embodiment, mounted directly to one side of the tank 14 and defines therein a small-volume chamber for containing a quantity of concentrated new coolant, which concentrated new coolant conventionally has a biocide added thereto.

To provide for flow of the coolant to and from the tanks associated with the system 10 a motor-driven pump 31 is mounted on the cart and is provided with a suction inlet 32 and a discharge outlet 33. The pump inlet 32 connects, through a suitable two-way directional valve 35, to a conduit 34 which at its remote end communicates with the bottom of the chamber 23 in which the contaminated coolant is temporarily stored. The pump 31 hence sucks the dirty coolant from the chamber 33 and discharges it through the outlet 33 into a discharge conduit 36 which couples to a further two-way directional flow-control valve 37, which valve 37 in turn couples to a further conduit 38 which at its other end discharges into the upper end of the oil filtering apparatus 25.

The control valve 37 also couples to one end of an elongate flexible discharge hose 39.

To remove the cleaned coolant from the chamber 28, a conduit 41 has one end thereof communicating with the bottom of the chamber 28, and the other end of this conduit 41 couples to the two-way flow valve 35 which controls the supply of fluid to the pump inlet 32.

A further conduit 42 is connected between the concentrate tank 29 and the pump 31 for selectively permitting the adding of new concentrated coolant when considered necessary or desirable. This conduit 42 has the discharge (ie, lower) end thereof connected to the pump inlet 32, whereas the upper end of conduit 41 couples to the tank 29 through a suitable flow-control valve 43, the latter being manually controllable between open and closed positions when addition of new coolant concentrate is desired.

While the operation of the recycling apparatus 10 of the present invention is believed apparent from the description given above, nevertheless same will be briefly summarized below to ensure a complete understanding thereof.

It will be understood that the apparatus 10 is used for recycling a batch of contaminated coolant and hence will be considered to be a batch-type operation, and not a continuous-type operation. That is, most machine tools contained a predetermined volume of coolant, and hence the coolant associated with a single machine tool will typically be recycled at one time by means of the apparatus 10 of this invention.

The apparatus 10 can be manually wheeled into a position in close proximity to the machine tool. The wand 19 is then inserted into the coolant sump of the machine tool and, by energizing the suction device 16, the coolant is sucked from the sump through the conduit 18 into the suction device 16 and discharged through the lower discharge thereof into the filter bag 22. Most solids are filtered out by the bag 22 as the coolant flows downwardly and collects in the bottom chamber 23 of the tank 14. The coolant which collects in the chamber 23, however, is still contaminated inasmuch as it contains tramp oil. Further, the coolant may also still contain extremely fine solids which pass through the filter bag 22.

By energizing the pump 32 and by suitably positioning the valves 35 and 37, the pump 31 sucks the contaminated coolant from chamber 23 through conduit 34 and then pumps the coolant through conduit 38 for discharge into the upper end of the filtering apparatus 25. The coolant is supplied into the small closed chamber defined in the upper end of housing 25 above the filter pads 27. The coolant fills this chamber, and becomes pressurized by the pump. The pressurized contaminated coolant flows downwardly, assisted by gravity, through the filter pads 27 which absorb the tramp oil, and which effectively filter out any remaining solid fines. The thus filtered coolant then flows downwardly and collects in the chamber 28 defined at the bottom of the tank 15.

After all of the contaminated coolant has been sucked from the tank 14 and supplied to and filtered within the tank 15, then the direction of the valves 35 and 37 are both changed to the opposite flow or control position, and the free end of the hose 39 is inserted into the machine tool sump. Thus, the pump 31 effectively sucks the recycled clean coolant from the chamber 28 through the conduit 41 and discharges it through valve 37 into the hose 39 so as to resupply the coolant back into the machine tool sump.

If desired or necessary, the valve 43 can be opened so that new coolant concentrate can be supplied from tank 29 to the pump 31, whereupon the pump will then supply the coolant to the hose 39 for deposit in the machine tool sump.

If a single filtering of the contaminated coolant by the filtering arrangement 25 is not believed sufficient to achieve the desired degree of filtering, then the coolant can be recycled through the filter 25 for a second or third time if necessary or desirable. After the coolant has been initially filtered by the filter 25 and collected in the chamber 28, then by suitable positioning of the valves 35 and 37, the pump 31 can suck the coolant from the chamber 28 through the conduit 41 and thence discharge the coolant into the conduit 38 so as to resupply the coolant to the filtering arrangement 25.

After a batch of coolant has been recycled and hence cleaned, or after several batches of coolant have been appropriately cleaned, the filter pads 27, which will have absorbed the tramp oil therein and which will also have collected some of the solid fines therein, can be manually removed from the upper end of the support member 26 and disposed of, and new filtering pads will be positioned within the support member so as to permit further recycling operations to be carried out.

While not shown, it will be understood that the pump 31 is conventionally electrically driven and has its own electric motor associated therewith, whereupon the motor has a conventional electrical cord associated therewith and carried on the cart. This cord will be connected to a suitable source of electrical energy so as to drive the pump when utilization of the apparatus 10 is desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for recycling and cleaning coolant utilized in conjunction with a machine tool to effect removal of both tramp oil and solids from the coolant, said apparatus comprising:
   a wheeled frame;
   first tank means stationarily supported on said frame and defining therein a first chamber for holding a batch of dirty coolant;
   a second tank means stationarily supported on said frame in sidewardly adjacent relationship to first tank means and defining therein a second chamber for holding a batch of recycled clean coolant;
   suction means mounted adjacent an upper end of said first tank means for sucking the dirty coolant from a machine tool sump and supplying it to said first chamber, said suction means including an elongated flexible suction conduit terminating at an inlet end which is insertable into a machine tool sump, said suction means having a discharge for discharging the dirty coolant into an upper portion of said first tank means;
   first filter means positioned within said first tank means downstream of and below the discharge of said suction means for removing solids from said dirty coolant while permitting the coolant to flow through the first filter means for collection in the first chamber which is disposed below said first filter means;
   second filter means mounted within an upper portion of said second tank means for removing tramp oil from the dirty coolant, said second filter means including oil-absorbent media for removing tramp oil from the coolant while permitting the coolant to flow downwardly through the media for collection in the second chamber as disposed below said second filter means;
   pump means mounted on said frame for transferring coolant to and from said first and second tank means, said pump means having an inlet and an outlet;
   first valve means for controlling flow to the inlet of said pump means, said first valve means having a discharge connected to the pump inlet, the first valve means also having first and second inlets, said first valve means being shiftable between first and second positions so as to provide selected communication with the first and second inlets respectively;
   second valve means for providing control over the fluid as discharged from the pump means, said second valve means having an inlet in communication with the pump discharge, said second valve means having first and second outlets which individually and respectively communicate with the inlet of the second valve means when the second valve means is respectively disposed in first and second positions;
   first conduit means having one end thereof communicating with a lower portion of said first chamber and the other end thereof connected to one of the inlets of said first valve means;
   second conduit means having one end thereof communicating with a lower portion of said second chamber and the other end thereof communicating with the other inlet of said first valve means;
   a third conduit having one end thereof communicating with an upper portion of said second filter means and the other end thereof communicating with the second outlet of said second valve means; and
   an elongate flexible discharge hose having one end thereof communicating or connected to the first outlet of said second valve means, the other end of said discharge hose being adapted for supplying the recycled coolant to a machine tool sump 2. An apparatus according to claim 1, including third tank means stationarily mounted on said cart means and defining therein a third chamber for containing a quantity of new coolant concentrate, a transfer conduit extending between said third tank means and the inlet to said pump, and on-off valve means associated with said transfer conduit for controlling flow of coolant concentrate therethrough.

3. An apparatus according to claim 2, wherein the free end of said suction conduit is provided with an elongate wand thereon adapted for insertion into the machine tool sump.

4. An apparatus according to claim 2, wherein said second filter means includes a hollow housing having discharge opening means at a lower end thereof in direct communication with said second chamber, said third conduit communicating with an inlet opening adjacent the upper end of said housing, said oil absorbent media comprising a cloth-like pad disposed in said housing between said inlet and discharge openings, the upper part of the housing being effectively sealed to permit pressurization of the oil therein.

5. An apparatus according to claim 1, wherein said second filter means includes a hollow housing having discharge opening means at a lower end thereof in direct communication with said second chamber, said third conduit communicating with an inlet opening adjacent the upper end of said housing, said oil absorbent media comprising a cloth-like pad disposed in said housing between said inlet and discharge openings, the upper part of the housing being effectively sealed to permit pressurization of the oil therein.

* * * * *